United States Patent
He et al.

(10) Patent No.: US 9,225,493 B2
(45) Date of Patent: Dec. 29, 2015

(54) MULTIMODE WIRELESS SYSTEMS AND METHODS

(71) Applicant: QUALCOMM Incorporated, San Diego, CA (US)

(72) Inventors: Xiaoyin He, San Diego, CA (US); Ashok Mantravadi, San Diego, CA (US); Bruce A Judson, San Luis Obispo, CA (US); Prashanth Akula, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 14/073,723

(22) Filed: Nov. 6, 2013

(65) Prior Publication Data

US 2015/0124661 A1    May 7, 2015

(51) Int. Cl.
| | | |
|---|---|---|
| *H04B 7/005* | (2006.01) | |
| *H04L 5/00* | (2006.01) | |
| *H04L 5/14* | (2006.01) | |
| *H04W 52/24* | (2009.01) | |
| *H04L 5/16* | (2006.01) | |
| *H04W 88/06* | (2009.01) | |
| *H04W 72/12* | (2009.01) | |
| *H04W 88/02* | (2009.01) | |

(52) U.S. Cl.
CPC ............ *H04L 5/0066* (2013.01); *H04L 5/14* (2013.01); *H04L 5/16* (2013.01); *H04W 52/243* (2013.01); *H04W 72/1226* (2013.01); *H04W 88/06* (2013.01); *H04W 88/02* (2013.01)

(58) Field of Classification Search
CPC ............................. H04B 7/088; H04W 72/048
USPC .......................................... 370/329; 455/501
See application file for complete search history.

(56) References Cited

U.S. PATENT DOCUMENTS

| | | | |
|---|---|---|---|
| 6,701,165 B1 * | 3/2004 | Ho et al. | 455/562.1 |
| 2006/0178157 A1 * | 8/2006 | Gebara et al. | 455/501 |

(Continued)

FOREIGN PATENT DOCUMENTS

| | | |
|---|---|---|
| GB | 2499259 A | 8/2013 |
| WO | 2006106378 A1 | 10/2006 |
| WO | 2012046172 A1 | 4/2012 |

OTHER PUBLICATIONS

Cheng W., et al., "Full/Half Duplex Based Resource Allocations for Statistical Quality of Service Provisioning in Wireless Relay Networks," 2012 Proceedings IEEE INFOCOM, Mar. 2012, pp. 864-872.

(Continued)

*Primary Examiner* — Wanda Z Russell
(74) *Attorney, Agent, or Firm* — Fountainhead Law Group P.C.

(57) ABSTRACT

The present disclosure includes systems and methods for operating a wireless communication system in multiple modes. The system is configured in a first mode when a transmission interference in a receiver of a wireless device is below a first threshold. The system is configured in one or more intermediate modes when the transmission interference is above the first threshold and below a second threshold. The system is configured in a second mode when the transmission interference is above the second threshold. The one or more intermediate modes activate interference management processes and the wireless device transmits data and receives data simultaneously. In some embodiments, transmission interference may be based on an SINR measurement.

24 Claims, 5 Drawing Sheets

(56) References Cited

U.S. PATENT DOCUMENTS

| | | | |
|---|---|---|---|
| 2007/0286156 A1* | 12/2007 | Gormley et al. | 370/350 |
| 2009/0213765 A1* | 8/2009 | Rinne et al. | 370/278 |
| 2012/0046057 A1* | 2/2012 | Pesola et al. | 455/509 |
| 2012/0224497 A1* | 9/2012 | Lindoff et al. | 370/252 |
| 2013/0078982 A1 | 3/2013 | McCoy | |
| 2013/0148619 A1* | 6/2013 | Ahn et al. | 370/329 |
| 2013/0301687 A1* | 11/2013 | Grant et al. | 375/148 |

OTHER PUBLICATIONS

Riihonen T., et al., "Hybrid Full-Duplex/Half-Duplex Relaying with Transmit Power Adaptation," IEEE Transactions on Wireless Communications, vol. 10 (9), Sep. 2011, pp. 3074-3085.

Shende N., et al., "Half-Duplex or Full-Duplex Relaying: A Capacity Analysis under Self-Interference," CISS, 2013, 6 Pages.

International Search Report and Written Opinion—PCT/US2014/064138—ISA/EPO—Feb. 11, 2015.

* cited by examiner

MULTIMODE WIRELESS SYSTEMS AND METHODS

BACKGROUND

The present disclosure relates to wireless systems and methods, and in particular, to systems and methods for multimodal wireless operation.

Wireless systems allow information to be communicated between electronic devices over the airwaves using RF signals. While a variety of wireless systems and protocols exist, one common problem with such systems is that performance of a wireless channel degrades as a cellular handset, sometimes referred to as "user equipment" ("UE"), moves farther away from a base station (e.g., an eNB). In systems where the wireless systems are transmitting and receiving at the same time (e.g., Full Duplex Systems), degradation of the handset receiver with increasing distance is particularly problematic. For instance, as a cellular handset moves further away from a base station, the handset transmitter typically increases it's transmit power based on power control in multiple access systems, which in turn increases interference in the handset receiver. The impact of such interference from the transmitter in the receiver can be reduced by stringent isolation specification of a duplexer. Such duplexers are expensive and occupy large area, especially for a handset supporting multi-band operation.

SUMMARY

The present disclosure includes systems and methods for operating a wireless communication system in multiple modes. The system is configured in a first mode when a transmission interference in a receiver of a wireless device is below a first threshold. The system is configured in one or more intermediate modes when the transmission interference is above the first threshold and below a second threshold. The system is configured in a second mode when the transmission interference is above the second threshold. The one or more intermediate modes activate interference management processes and the wireless device transmits data and receives data simultaneously. In some embodiments, transmission interference may be based on an SINR measurement.

In one embodiment, the present disclosure provides a method comprising configuring a wireless device to operate in a first mode when a transmission interference from a transmitter of the wireless device in a receiver of the wireless device is below a first threshold, wherein in the first mode the wireless device transmits data and receives data simultaneously, configuring the wireless device to operate in one or more intermediate modes when the transmission interference is above the first threshold and below a second threshold, wherein in the one or more intermediate modes the wireless device transmits data and receives data simultaneously and activates one or more interference management processes, and configuring the wireless device to operate in a second mode when the transmission interference is above the second threshold, wherein in the second mode the wireless device transmits data and receives data during different time periods.

In one embodiment, the one or more intermediate modes comprise a plurality of intermediate modes, wherein different interference management processes are activated in different intermediate modes based on the transmission interference.

In one embodiment, the one or more interference management processes comprise a non-linear interference cancellation process.

In one embodiment, the one or more interference management processes include reducing a maximum transmit power as the transmission interference increases.

In one embodiment, the method further comprises determining a first interference when the wireless device is not transmitting, determining the transmission interference when the wireless device is transmitting, and adjusting the maximum transmit power based on a different between the first interference and the transmission interference.

In one embodiment, a first maximum transmit power during a first time period is reduced to a second maximum transmit power during a second time period based on a difference between the first interference and the transmission interference.

In one embodiment, the maximum transmit power is reduced by not more than a maximum transmit power reduction corresponding to particular increase in throughput loss.

In one embodiment, the method further comprises determining the transmission interference when the wireless device is transmitting and activating said interference management process reducing the maximum transmit power when a difference between the transmission interference and a minimum transmission interference below which there is no data rate improvement is greater than a third threshold.

In one embodiment, the method further comprises sending a maximum transmit power reduction from the wireless device to a base station to coordinate a data rate from the wireless device to the base station.

In one embodiment, the one or more interference management processes include re-assigning transmit frequency allocations to reduce transmission interference.

In one embodiment, modifying the transmission from the wireless device to increase the frequency separation between the transmission band and the receive band comprises narrow-banding the transmission.

In one embodiment, modifying the transmission from the wireless device to increase the frequency separation between the transmission band and the receive band comprises deactivating resource blocks proximate to the receive band of the wireless device.

In one embodiment, modifying the transmission further comprises adaptively filtering the transmission from the wireless device to attenuate resource blocks proximate to the receive band of the wireless device and to reduce a total transmit power.

In one embodiment, modifying the transmission further comprises sending one or more messages between the wireless device and a base station to deactivate said resource blocks proximate to a receive band of the wireless device.

In one embodiment, the plurality of intermediate modes comprise configuring the wireless device to operate in a first intermediate mode, wherein in the first intermediate mode a first interference management process is activated, the first interference management process comprising a non-linear interference cancellation process, configuring the wireless device to operate in a second intermediate mode, wherein in the second intermediate mode a second interference management process is activated, the second interference management process comprising reducing a maximum transmit power, and configuring the wireless device to operate in a third intermediate mode, wherein in the third intermediate mode a third interference management process is activated, the third interference management process comprising modifying a transmission from the wireless device to re-assign transmit frequency allocations to increase a frequency separation between a transmission band and a receive band.

In one embodiment, a plurality of the interference management processes are activated at the same time.

In one embodiment, one or more interference management processes are deactivated when one or more other interference processes are activated.

In one embodiment, the wireless device transmits a request to switch from the one or more intermediate modes to the second mode when a maximum transmit power is reduced to a usable minimum and when a maximum number of resource blocks comprising transmission frequencies proximate to a receive band have been restricted from use in a transmission.

In one embodiment, the method further comprises dynamically filtering a received RF signal between an antenna and a low noise amplifier in the first mode and the one or more intermediate modes, and bypassing said dynamic filtering in the second mode.

In one embodiment, the first mode and the one or more intermediate modes are full duplex modes and the second mode is a half duplex mode.

In one embodiment, transmission interference corresponds to a signal-to-interference ratio (SINR).

In one embodiment, the transmission interference corresponds to a data throughput.

In one embodiment, the wireless device is configured to transmit and receive a plurality of bands, wherein a first subset of the plurality of bands are home network bands and the wireless device operates in full duplex mode using dedicated wireless transmitters and wireless receivers for each home network band, and wherein a second subset of bands are secondary bands and the wireless device is configured to operate in the first mode, the one or more intermediate modes, and the second mode using a tunable wireless transmitter and wireless receiver for the secondary bands.

In another embodiment, the present disclosure provides an apparatus comprising a wireless device comprising a wireless transmitter and a wireless receiver, wherein the wireless device is configured to operate in a first mode when a transmission interference from the transmitter in the receiver is below a first threshold, wherein in the first mode the wireless device transmits data and receives data simultaneously, wherein the wireless device is configured to operate in one or more intermediate modes when the transmission interference is above the first threshold and below a second threshold, wherein in the one or more intermediate modes the wireless device transmits data and receives data simultaneously and activates one or more interference management processes, and wherein the wireless device is configured to operate in a second mode when the transmission interference is above the second threshold, wherein in the second mode the wireless device transmits data and receives data during different time periods.

In one embodiment, the receiver comprises a low noise amplifier and a tunable filter between the low noise amplifier and an antenna, the tunable filter configured to reduce a transmit power and transmission interference from the transmitter.

In one embodiment, the wireless transmitter and wireless receiver are tunable, the wireless device further comprising a plurality of dedicated wireless transmitters and wireless receivers. The wireless device is configured to transmit and receive a plurality of bands, where a first subset of the plurality of bands are home network bands and the wireless device operates in full duplex mode using the dedicated wireless transmitters and wireless receivers for each home network band. A second subset of bands are secondary bands and the wireless device is configured to operate in the first mode, the one or more intermediate modes, and the second mode using the tunable wireless transmitter and wireless receiver for the secondary bands.

The following detailed description and accompanying drawings provide a better understanding of the nature and advantages of the present disclosure.

DETAILED DESCRIPTION

The present disclosure pertains to systems and methods for multimodal operation of a wireless system. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
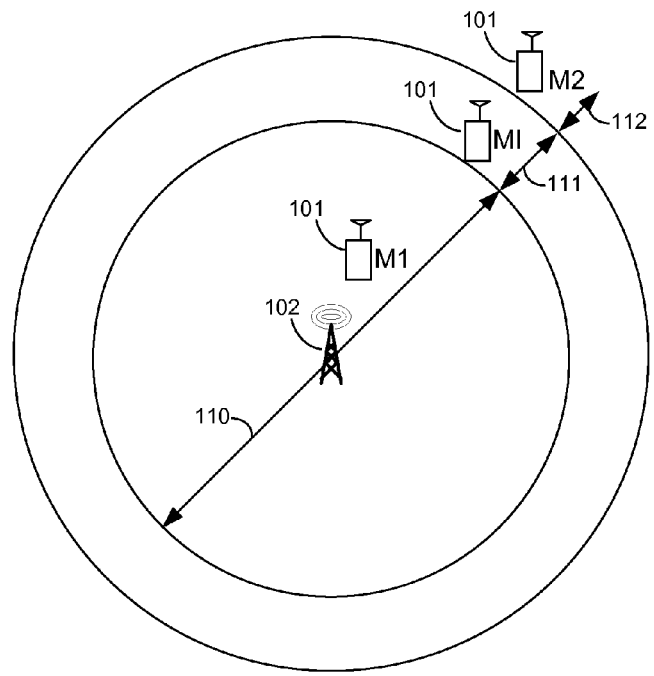
FIG. 1 illustrates multimodal operation of a wireless communication system according to one embodiment.

Features and advantages of the present disclosure include reconfiguring a wireless communication system to operating in different modes. A wireless communication system (hereinafter, "wireless system") may include a wireless communication device (hereinafter, "wireless device"), such as a cellular handset, and a base station, for example. FIG. 1 illustrates a wireless device 101 communicating information with a wireless base station 102 over the airwaves. Wireless device 101 may include any of a variety of wireless devices such as a mobile phone, tablet computer, mobile computer, or other electronic device including wireless communication circuits, for example. Embodiments of the present disclosure may be applicable to cellular communication systems such as devices that communicate using LTE, UMTS/HSPA, or CDMA, for example.

In one embodiment, wireless communication system may be operable in different modes. For example, in one region (denoted by diameter 110) wireless device 101 may be operable in a first mode M1. Diameter 110 illustrates a range of locations where wireless device 101 is sufficiently close to base station 102 such that the communication channel between the two systems performs with limited degradation. In particular, in mode M1, wireless device 101 may transmit data and receive data simultaneously, and wireless device 101 is sufficiently close to base station 102 such that a transmission interference from a transmitter of the wireless device 101 in a receiver of the wireless device 101 is below a first threshold Th1. The threshold Th1 may correspond to a level of transmission interference above which the receiver would be unable to properly receive and process signals from the base station according to desired performance levels, for example. In one embodiment, when the transmission interference increases above threshold Th1, wireless device 101 is configured to operate in one or more intermediate modes MI. In the intermediate mode(s), wireless device 101 transmits data and receives data simultaneously and activates one or more interference management processes. The interference management processes may adjust a variety of aspects of the wireless communication system to allow for simultaneous transmission and reception of information across an extended range, for example. As the transmission interference increases (e.g., due to increasing range) various interference management processes may be activated. However, when the transmission interference increases above a second threshold Th2, wireless device 101 is configured to operate in a second mode. In the second mode, the wireless communication system transmits data and receives data during different time periods. Accordingly, transmission interference from the transmitter into the receiver is reduced or eliminated. Wireless device 101 may be operable in the intermediate mode(s) over range 111, and wireless device 101 may be operable in mode M2 over range 112, for example.

As the wireless device goes through different operating modes, the base station 102 can have correspondingly different operating modes. A base station may serve many devices, and some devices may be in M1, some in M2, and some in MI at the same time, for example. Accordingly, the base station may be in full duplexed mode all the time. The operating modes may be enabled at the base station through explicit messaging from the wireless device requesting a change at the base station. For example, in mode M2, the base station can ensure that the wireless device does not transmit and receive simultaneously by modifying the operation of a scheduler 203 to separate uplink (UL) and downlink (DL) packets in time. Similarly, in one of the intermediate modes, the base station scheduler could restrict the transmission of UL packets to occupy only a part of the available frequency resources. In one of the intermediate modes, the scheduler may also reduce the modulation and/or coding rate of the packets assigned to the wireless device to enable uplink transmissions at a lower power.

Figure 2:
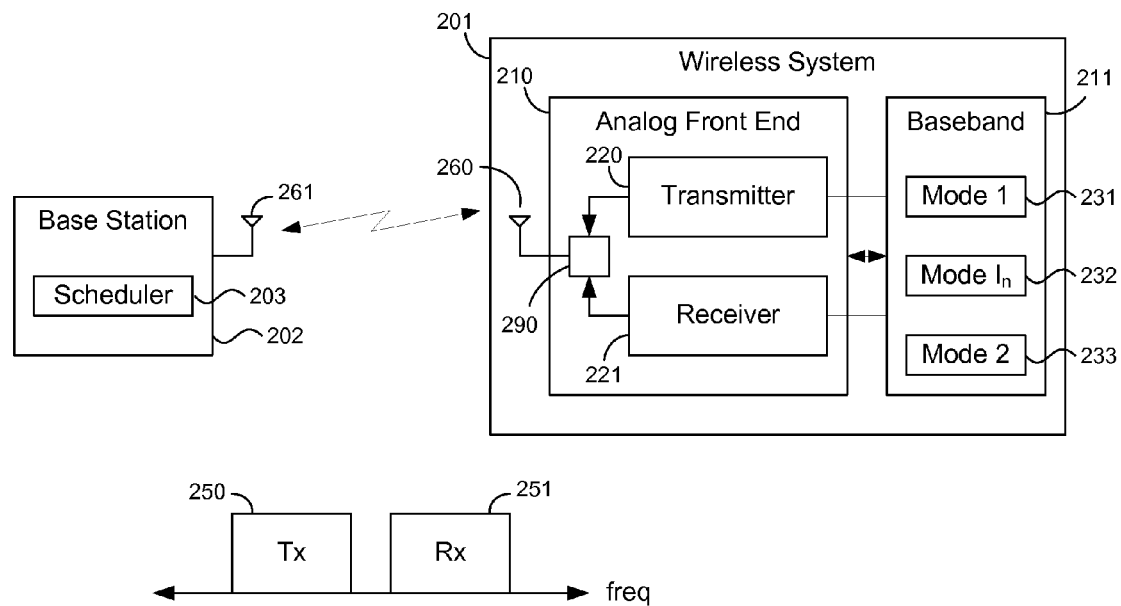
FIG. 2 illustrates a wireless communication system according to one embodiment.

FIG. 2 illustrates a wireless communication system according to one embodiment. In this example, a wireless device 201 communicates information with a base station 202 by transmitting and receiving signals over the airwaves between one or more antennas 260 and 261. Wireless device 201 may include an analog front end component 210 and a baseband component 211. Analog front end 210 includes an analog transmitter 220 and an analog receiver 221. Baseband 211 may include digital portions of the transmitter and the receiver (not shown) that perform coding and decoding of digital signals, for example. RF signals are received on antenna 260 and coupled to receiver 221, where the RF signal may be amplified, demodulated (e.g., down-converted), filtered, converted to digital signals, and provided to baseband processor 211 for extraction of the information. This is one example of a receiver. In the other direction, digital information may be encoded in digital signals by baseband processor 211 and provided to analog front end 210, which converts the digital signals to analog signals, modulates the signals, and provides an amplified RF signal for transmission on antenna 260. Coupling components 290 couple signals from the transmitter 220 to antenna 260 and from antenna 260 to receiver 221 and may be configured to selectively couple the transmitter and receiver independently to the antenna at different time periods in the second mode described above, for example. An example RF signal spectrum is illustrated at 250 and 251, which illustrates that a transmission frequency spectrum 250 may be separated in frequency from a receive frequency spectrum 251 to allow for simultaneous transmission and reception by the wireless device 201. Tx spectrum 250 represents an example transmission spectrum of RF signals produced by transmitter 220 and Rx spectrum 251 represents an example receive spectrum of RF signals processed by receiver 221. Accordingly, Tx spectrum 250 is sometimes referred to as the uplink (UL) spectrum and Rx 251 is sometimes referred to as the downlink (DL) spectrum.

As mentioned above, wireless device 201 may be operated in different modes with different active interference management processes based on transmission interference. As illustrated in FIG. 2, baseband processor 211 and/or analog front end 210 may be configured to operate in a first simultaneous transmission mode (Mode 1), one or more intermediate simultaneous transmission modes 232 (Mode In) with different interference management processes, for example, and a second mode 233 (Mode 2) where transmission and reception are done at different time periods. In one embodiment, Mode In may include different interference management processes activated in different intermediate modes based on the amount of transmission interference, for example.

Figure 3:
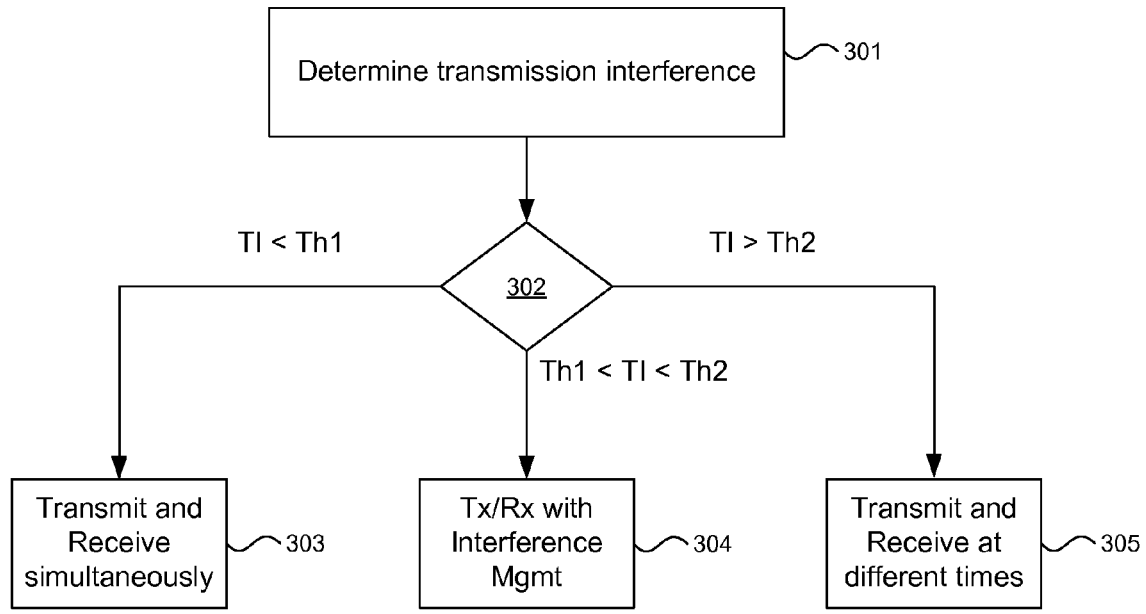
FIG. 3 illustrates a process for multimodal operation according to one embodiment.

FIG. 3 illustrates a process for multimodal operation according to one embodiment. In this example process, a transmission interference (TI) is determined at 301. In one example embodiment, transmission interference may be captured through a signal-to-interference ratio (SINR) measurement of a receiver of a wireless device caused by a simultaneous transmission from a transmitter of the wireless device. At 302, TI may cause a wireless system to be configured in multiple different ways. If TI is less than a first threshold Th1, then the wireless system is configured, at 303, in a first mode that transmits and receives information simultaneously (e.g., across different frequencies). One example implementation may be a full duplex (FD) mode. If TI is above Th1 and below a second threshold Th2, then the wireless system may be configured, at 304, in an intermediate mode that transmits and receives simultaneously with interference management (e.g., FD with interference management). Alternatively, if TI is greater than Th2, then the wireless system may be configured, at 305, in a second mode where transmissions are performed at different time periods than reception. One example implementation may be a half duplex (HD) mode. The transmission interference may be measured explicity, or equivalent thresholds could be derived based on other metrics such as signal-to-interference ratio (SINR), received signal power, or packet error rate (PER). It should be noted that transmission interference (TI) may be determined using different techniques, and the particular technique may impact the threshold used. For example, TI and SINR are two different but related metrics. When transmission interference increases, SINR decreases, so thresholds are inversely related. In particular, the above procedure can be implemented equivalently by using the SINR directly but modifying the order of the thresholds, i.e. high threshold on TI would be low threshold on SINR and so on. Accordingly, transmission interference being above a particular threshold may correspond to detecting an SINR below a particular SINR threshold, and transmission interference being below a particular threshold may correspond to detecting an SINR above a particular SINR threshold.

Figure 4:
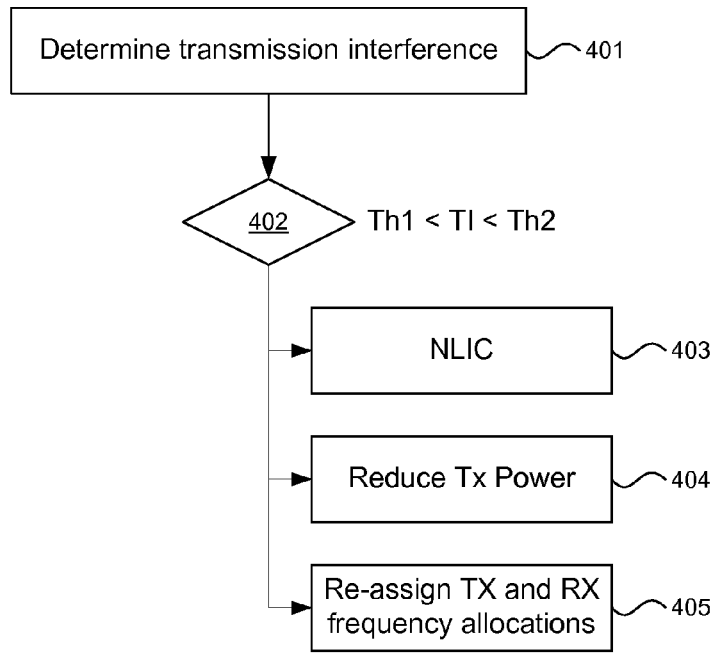
FIG. 4 illustrates interference management according to one embodiment.

FIG. 4 illustrates interference management according to one embodiment. At 401, a transmission interference (e.g., through SINR) may be determined. If the transmission interference is between the Th1 and Th2, the wireless system may activate one or more of a plurality of interference management processes based on the transmission interference. FIG. 4 shows three example interference management processes, including non-linear interference cancellation (NLIC) at 403, transmit power reduction at 404, and re-assigning transmission and receive frequency allocations at 405 (e.g., increasing the frequency separation between the signals transmitted by the transmitter of the wireless device and the signals received by the receiver of the wireless device). In one embodiment, a plurality of interference management process may be activated at the same time. In other embodiments, one or more interference management processes are deactivated when one or more other interference management processes are activated. Different activated interference management processes may correspond to different intermediate modes of operation of the wireless system, for example.

Figure 5:
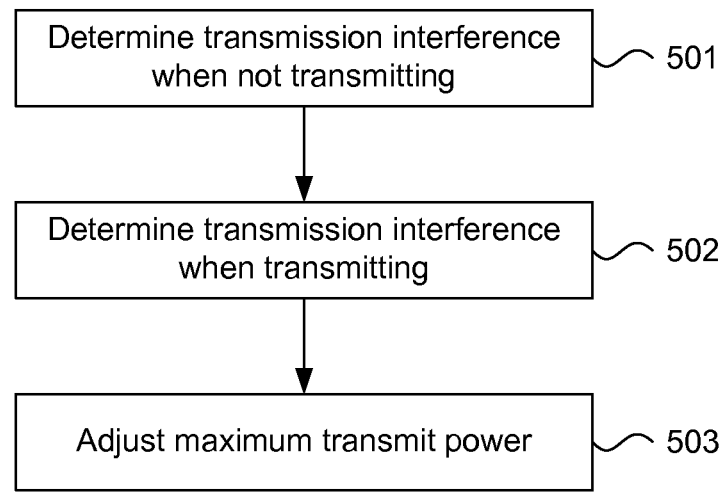
FIG. 5 illustrates an example of adjusting the transmit power to reduce interference according to one embodiment.

FIG. 5 illustrates an example of adjusting the maximum transmit power to reduce interference according to one embodiment. In some example implementations, an intermediate mode may include reducing a maximum transmit power. For example, at 501, a transmission interference (TI) may be determined when the transmitter of the wireless device is not transmitting (i.e., no interference from transmitter). At 502, a transmission interference (TI) may be determined when the transmitter is transmitting. The maximum transmit power, for example, may be adjusted based on a difference between the two detected transmission interferences at 503. Accordingly, if the transmit power during a first time period starts to cause an increase in TI in the receiver, then the maximum transmit power, for example, can be reduced to a second lower transmit power during another time period based on the determined transmission interferences to lower the TI. If the TI begins to drop (e.g., as the wireless device gets closer to the base station), then the maximum transmit power can be increased again, for example. Transmission interference may be determined regularly during system operation to ensure proper operation.

Power reduction in some example embodiments may be done over a chosen time period as illustrated in the following example. An SINR may be computed in received downlink sub-frames where there is no uplink transmission. Such sub-frames are typically present in applications where all uplink sub-frames are not allocated. The SINR computed without a transmission occurring is referred to as SINRg (e.g., "good"). An SINR may be computed in received downlink sub-frames where there is an uplink transmission, and hence, there is a higher level of transmission interference. Such sub-frames are present in a full duplex (FD) application. The SINR computed with a transmission occurring is referred to as SINRb (e.g., "bad"). The maximum transmit power setting may be reduced in steps based on the difference between SINRg and SINRb. For example, one specific algorithm for adjusting the maximum transmit power setting based on a difference between SINRg and SINRb is as follows:

$$Pmax(n) = Pmax(n-1) - \mu(SINRg - SINRb - \eta),$$

Where $\mu$ is step size and $\eta$ (dB) is a margin for the degradation due to the interference. Power reduction may also lead to uplink throughput loss. Therefore, in one embodiment, the maximum transmit power may be reduced by not more than a maximum transmit power reduction, which is a lower limit maximum transmit power and may correspond to particular decrease in throughput. Setting a lower limit on the maximum transmit power may help preserve some minimum level of throughput. When such a limit is hit (e.g., repeatedly or consistently), the wireless system may switch to half-duplex (HD) mode. Switching to HD mode may similarly lead to loss in the uplink peak throughput (e.g., as much as 50% or more). Accordingly, the maximum transmit power reduction (i.e., the lower limit on maximum transmit power) may be limited to a value where the loss in throughput is approximately equal to the loss in throughput corresponding to a switch to HD mode. An example range of maximum transmit powers may be as follows: Pmax=23 dBm down to 20 dBm.

In one example embodiment, reduction of the maximum transmit power may be activated when a measured SINRb at 502 is sufficiently below a maximum SINR, "SINRmax," where SINRmax is an SINR above which there is no data rate improvement. In some applications this may correspond to the highest modulation/coding (MCS) that can be achieved, for example. Accordingly, maximum transmit power reduction is done when a transmission interference is actually leading to some throughput loss. Therefore, in one embodiment, the wireless system may determine the transmission interference when the wireless device is transmitting and activate the interference management process reducing the maximum transmit power when a difference between the transmission interference and a minimum transmission interference (e.g., below which there is no data rate improvement) is greater than a threshold, for example. This may correspond to a difference between SINRmax and SINRb exceeding a threshold, for example.

In some embodiments, power reduction information may be communicated to a base station. For example, in one embodiment, a wireless device may send a maximum transmit power reduction from the wireless device to a base station to coordinate a data rate from the wireless device to the base station. For example, maximum transmit power reduction may be conveyed to an eNB through modified power headroom (PHR) reports. A base station may schedule data rates for an uplink of a wireless system. Communicating transmit power reduction information may allow the base station and wireless device to coordinate transmit power reduction and data throughput, for example.

Figure 6:
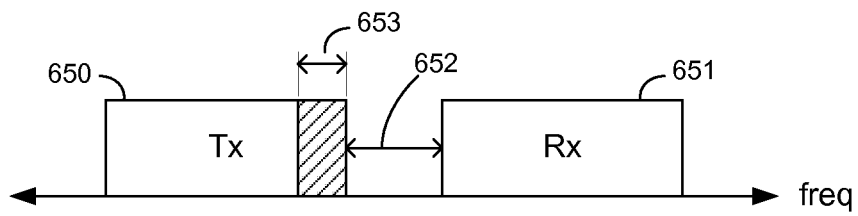
FIG. 6 illustrates an example of re-assigning TX and RX frequency allocations to increase frequency separation to reduce interference according to one embodiment.

FIG. 6 illustrates an example of re-assigning Tx and Rx frequency allocations by increasing frequency separation to reduce interference according to one embodiment. As mentioned above, the interference management processes may include modifying a transmission from the wireless device to increase a frequency separation between a transmission band and a receive band. FIG. 6 illustrates an example transmission band (Tx) 650 and receive band (Rx) 651. Between Tx and Rx is a guard band 652. The transmitter is configured to transmit RF signals over Tx 650, and the receiver is configured to process RF signals in Rx 651. In this example, the transmission signal is limited to low section of the Tx band outside of section 653. Modifying Tx frequency allocations by narrow banding the Tx RF signal leads to a slightly increased guard band and reduces emissions because of the narrower bandwidth of the uplink. Accordingly, by increasing the frequency separation between the transmission band and receive band, the interference in the receive band caused by the transmission band may be reduced.

In one embodiment, re-assigning transmit frequency allocations may include reducing intermodulation products that may appear in the receive band. For example, in some cases, the transmitted signal is not single block as shown in FIG. 6, but rather, 2 blocks separated. The intermodulation product of these two blocks can appear in the receive band. Re-assigning transmit frequency allocations of these two blocks can reduce interference as well.

In one example embodiment, resource blocks in the transmitted RF signal that are closer to the receive band 651 may be restricted (i.e., not used). For example, in Long Term Evolution ("LTE"), a time slot (or just "slot") in a sub-frame (e.g., 1 ms) may comprise multiple resource blocks on 7 symbols. Each resource block may include 12 subcarriers. Transmission bandwidth corresponds to the number of active resource blocks in a transmission. As the number of resource blocks increases, the bandwidth increases. A particular transmission bandwidth configuration is the maximum number of resource blocks for the particular channel bandwidth. The maximum occupied bandwidth is the number of resource blocks multiplied by 180 kHz, according to one example LTE standard. Accordingly, restricting resource blocks effectively narrow bands the transmission signal and reduces the transmission interference. Therefore, in one example embodiment, the transmission from the wireless device may be modified to increase the frequency separation between the transmission band and the receive band by deactivating transmit blocks (e.g., resource blocks) proximate to the receive band of the wireless device. Narrow banding the transmission signal may be achieved in other wireless technologies by similarly restricting the use of subcarriers proximate to the receive band.

In one embodiment, maximum transmit power reduction and re-assigning frequency allocation techniques may be combined through the use of adaptive filtering of the transmission from the wireless device. For example, in one example embodiment, the transmission is modified by adaptively filtering the transmission from the wireless device to attenuate resource blocks proximate to the receive band of the wireless communication system and to reduce a total transmit power. When the transmission interference is low, a bandwidth of an adaptive filter in the transmitter may be increased to include the entire transmission band, and when the transmission interference increases, the bandwidth of the adaptive (e.g., tunable) filter may be decreased to attenuate frequencies proximate to the receive band, thereby narrow banding the transmission band and increasing frequency separation. As the transmission interference increases, the filter response may further attenuate resource blocks close to the receive band and reduce total transmit power at the same time. A base station, such as an eNB, may include the filter attenuation in the channel to avoid scheduling the resource blocks attenuated by the filter. Alternatively, one or more messages may be sent between the wireless device and the base station to deactivate the resource blocks proximate to a receive band of the wireless system.

When the limits of the interference management processes are hit and the transmission interference cannot be mitigated effectively with interference management, the wireless system may transition into a mode where the transmission and receive processes are time separated. For instance, in the example interference management processes above, a maximum transmit power reduction and minimum number of resource blocks may be reached, and the wireless system requests a switch to a half duplex (HD) mode. Messaging to request HD patterns may be triggered, for example, by self-jamming of a wireless device due to its own transmitter. For an LTE application, uplink and downlink scheduling patterns may be consistent with HARQ timelines, for example, to maintain time relationships between sub-frames with Grants, Packets, ACKs and re-transmissions. For example, an 8-sub-frame periodic pattern with 4 consecutive uplink sub-frames and 4 consecutive downlink sub-frames may preserve the HARQ time-line for LTE-FDD. Other patterns may be generated by selecting different sets of 4 HARQ processes out of 8. However, such selection gives 50% duplex ratio. Equivalent TDD configurations and their HARQ time-lines may be used instead, for example, uplink/downlink timing may be the same as in TDD but the uplink and downlink are on different frequencies allowing for different uplink/downlink duplex ratios, including allowing more downlink than uplink.

Figure 7A:
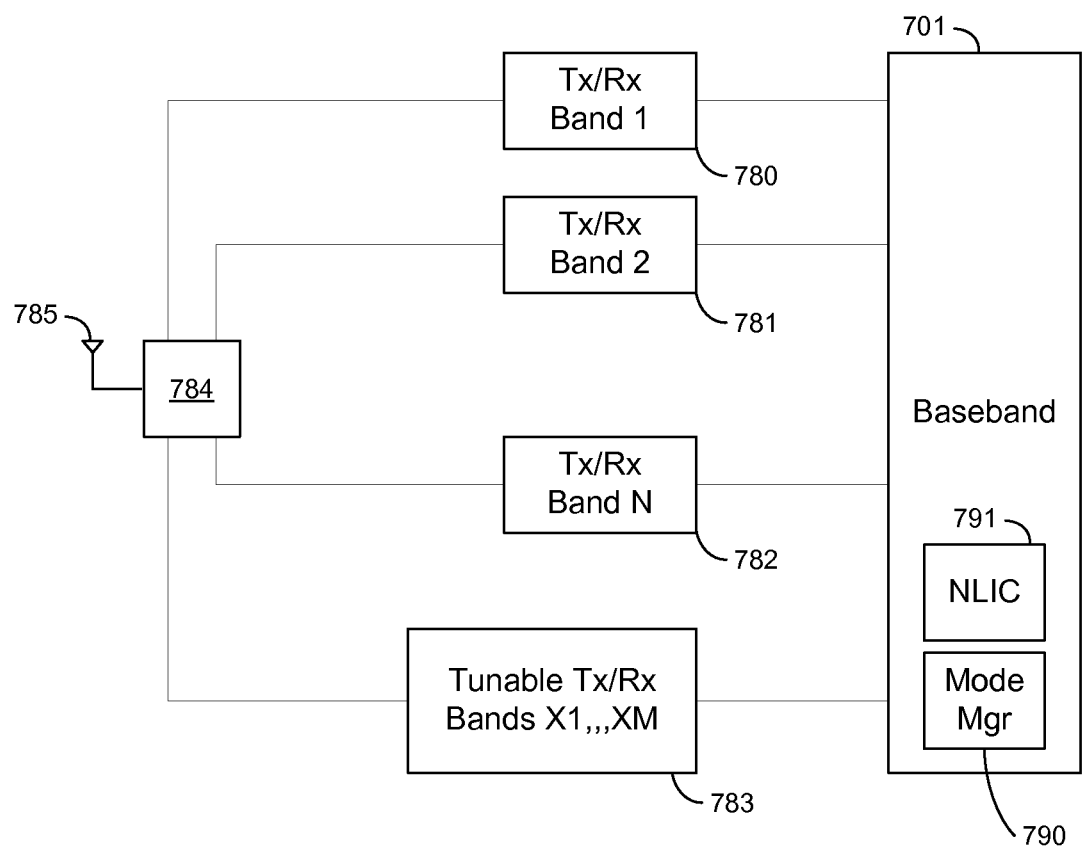
FIG. 7A illustrates multiple dedicated frontends and a tunable front end according to one example embodiment.

FIG. 7A illustrates multiple dedicated frontends and a tunable front-end according to one example embodiment. Another aspect of the present disclosure pertains to supporting home network bands and secondary bands (e.g., roaming bands) in a single wireless device. For example, a particular wireless device may be required to support multiple home network bands (e.g., Verizon® 850 MHz cellular band for EVDO/3G, 1900 MHz PCS band for EVDO/3G, 700 MHz band for LTE/4G, and 1700/2100 MHz AWS bands for LTE/4G). In addition to certain home network bands, a wireless device may be required to support numerous bands for roaming. Roaming bands may include bands for GSM, DCS, IMT, for example. Features and advantages of the present disclosure include using dedicated wireless transmitters and wireless receivers for home network bands and a tunable wireless transmitter and receiver for secondary bands. For example, home network bands may require higher performance than roaming bands, where a customer may be willing to tolerate a slightly lower performance for limited amounts of time while traveling, for example. Using a dedicated wireless transmitter and dedicated wireless receiver for home network bands allows the system to be tailored for maximum performance. However, for roaming, a multimodal tunable wireless transmitter and tunable wireless receiver or a tunable HD transceiver may be used (e.g., as described above), which may experience lower performance, but may support integration of multiple bands into a single transmitter and receiver (Tx/Rx) framework. As illustrated in FIG. 7A, a wireless device may include multiple Tx/Rx blocks 780-782 dedicated to a plurality of particular bands (e.g., Bands 1-N, where N is an integer). Each Tx/Rx block may be an analog front end having dedicated components optimized to transmit and receive a particular home network band having particular frequencies and unique processing requirements for a particular protocol. Roaming bands may be handled using a tunable Tx/Rx 783, which may support multiple bands X1 ... XM (M is an integer) having different frequencies and unique processing requirements for different roaming protocols. Tunable Tx/Rx may be configured into multiple modes as described above to improve performance of the wireless device while roaming. Accordingly, a baseband system 701 may include a non-linear interference cancellation (NLIC) module 791 and mode manager 790. The outputs of each Tx/Rx block 780-783 are coupled to an antenna through combiner circuitry 784, for example. Using the configuration shown in FIG. 7A, the wireless device may be configured to transmit and receive a plurality of bands. As mentioned above, a first subset of the plurality of bands are home network bands and the wireless device may operate in a full duplex mode using the dedicated wireless transmitters and wireless receivers for each home network band, for example. A second subset of bands are secondary (e.g., roaming bands) and the wireless device may be configured to operate in the above described first mode, the one or more intermediate modes, and the second mode using the tunable wireless transmitter and wireless receiver for the roaming bands. As described above, a multimodal tunable radio 783 may support full duplex, full duplex with interference management, and half duplex to improve the operation of the tunable section used when the wireless device is roaming. In special cases, a tunable radio used for secondary (e.g., roaming) bands may operate in HD only or HD with interference management.

Figure 7B:
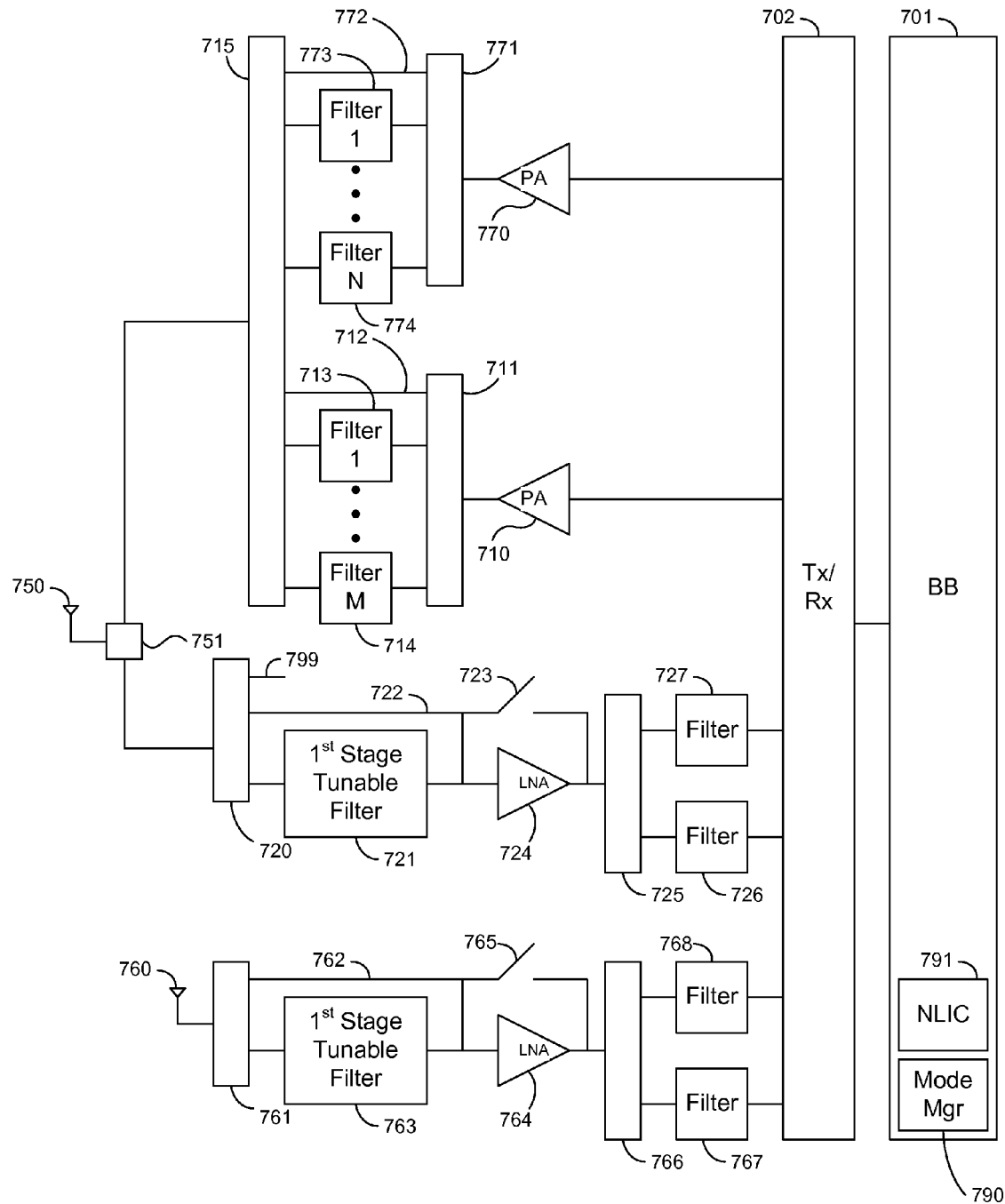
FIG. 7B illustrates an example tunable front end according to one example embodiment.

FIG. 7B illustrates an example tunable RF front end according to one embodiment. Features and advantages of the present disclosure further include a tunable RF front end architecture with mode management. Adaptive multimode operation, as described herein, may allow a front end with lower isolation requirements between the transmitter and receiver, for example. A radio RF front end with tunable components (e.g., with lower Q than SAW and FBAR) may be advantageously used in a multimode system (e.g., for roaming) FIG. 7B illustrates one example wireless device 700 to transmit and receive information.

A transmission may start with digital data in baseband 701 being encoded according to a wireless protocol, such as LTE, UMTS/HSPA, or CDMA, for example. The encoded digital data is provided to an analog transceiver 702 that preprocesses the signal to produce an RF signal to be transmitted. The RF signal is coupled to a power amplifier (PA) 710. In this example, an output of amplifier 710 is coupled through a switch 711 and through one of a plurality of filters 713-714 or a bypass connection 712 to a second switch 715. Filters 713-714 are M (an integer) bandpass filters, which pass the entire operation Tx bands and provide rejection out-of-band and at key frequencies like Rx bands, harmonic frequencies, and other bands to meet out-of-band emission requirements set by standards and regulatory bodies. Bypass connection 712 may be used when half duplex mode is activated. In this example, the RF signal to be transmitted is coupled from an output of switch 715 to antenna 750 through a switchable diplexer 751.

Reception of a downlink signal from a base station starts by receiving an RF signal on antenna 750 and coupling the signal through network 751 to switch 720. Switch 720 may couple the signal to a first stage tunable filter 721 to reduce transmission interference, to a bypass path 722 in case the Tx power is low, or to open path 799 in case of half duplex mode. Filter 721 is tuned to reject Tx frequency of the wireless device. When the Tx power is low enough, the filter can be bypassed, and as the power increases the filter's rejection can be tuned to optimize the rejection of the Tx signal (i.e. minimize the Tx Interference). Filter 721 may prevent downstream low noise amplifier (LNA) saturation and reduce non-linear products generated in the LNA.

In this example, a high linearity wideband LNA 724 receives the RF signals from the antenna and provides a first stage amplification. LNA 724 may be bypassed using switch 723, for example, depending on Tx power and transmission jammer conditions. For example, in case of very high Tx power, the 1st stage filter 721 may not provide enough Tx rejection to prevent saturation of LNA 724 or a strong non-linearity product in LNA. In this case the LNA may be bypassed, for example.

An output of LNA 724 is couple to a splitter 725 (e.g., a Di/Tri/Quad-plexer/splitter). Splitter 725 directs the amplified RF signals to second stage tunable filters 726 and 727. Filters 726 and 727 provide further reduction of transmission interference (as well as other interferences) and support for carrier aggregation, for example. Each filter 726 and 727 may support a specific band or band group, for example, such as a 3GPP Rx band or 3GPP band group. The number of second stage filters is determined by the number of carriers in a particular carrier aggregation implementation. The output of each filter is coupled to a receive portion of transceiver 702 for demodulation and conversion to digital signals. The digital signals are provided to baseband 701 for decoding and further processing.

Mode manager 790, shown in the baseband for illustrative purposes, may control mode switching based on transmission interference on a received signal, for example. In this example, mode switching and band selection may be achieved by controlling switches 711, 715, 720, and switchable network 751. Mode manager 790 may also control the maximum transmit power and resource block allocations of the uplink Tx as described above, as well as the Tx time slots, for example. Baseband 701 may also include a non-linear interference cancellation (NLIC) module 791 to further reduce interference caused by uplink Tx transmissions. In some implementations, uplink Tx transmission interference may be uplink Tx emission in Rx bands, $2^{nd}$ and $3^{rd}$ order intermodulation (IM) products (IM2 and IM3), higher order IM products of the Tx transmission, or Tx harmonics of the wireless device. Transmission interference may also be mixing products of the Tx transmission with other jammers. These interferences may be in the downlink Rx band or other associated carrier aggregation Rx bands. In one embodiment, the non-linear interference cancellation (NLIC) block reconstructs the interference based on the transmitted signal and a model for the non-linearity. The model may be dynamically adapted to track changes in the interference due to a way the wireless device is held, or due to changes in temperature and so on. Due to limitations of the assumed model and dynamic changes in the interference, the NLIC block is typically able to remove the interference only up to a certain limit. When this limit is exceeded, other intermediate modes of operation may be needed.

The example shown in FIG. 7B further illustrates aspects that may be used in some embodiments. For example, the transmitter may include a second power path through power amplifier 770 and components 771-774 including N filters (where N and M may be different), which supports bands differing from bands supported by 711-714. The second transmission path may be used for another band of frequencies for multiband operation. The present example also illustrates the use of a diversity receiver including diversity antenna 760 and components 761-768, which are substantially the same as components 720-727, for example, but may have different specifications. In some example implementations, additional diversity receivers may be used.

As 3G/4G wireless system deployment grows steadily, the number of supported bands increases dramatically. The conventional FD system requires a duplexer for each band supported, which increases the number of transceiver integrated circuit (IC) input/output pins and cost, as well as the front end cost and area.

A radio according to embodiments of the present disclosure may provide an option with a tunable RF front end to support multi-band operation. Multi-band HD radio, with a SAWless architecture or with tunable receiver filters, may provide another cost efficient solution to support multi-band operation.

Supported bands can be divided into two categories: home network bands and secondary bands (e.g., roaming network bands). The division can be made based on geographic areas, service providers, and technologies. In each home network, the number of supported bands may be limited. Conventional FD radio architecture is used for home network radios. In the other bands which support roaming networks, a multimode radio or an HD radio architecture may be used. While some throughput degradation of the wireless device can be expected in a roaming network with such embodiments, a simple RF front end and lower transceiver IC cost provides significant benefits. The benefits are more significant in wireless devices supporting MIMO and high order diversity receiver (HO DRx).

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
configuring a wireless device to operate in a first mode when a transmission interference from a transmitter of the wireless device in a receiver of the wireless device is below a first threshold, wherein in the first mode the wireless device transmits data and receives data simultaneously;
configuring the wireless device to operate in a plurality of intermediate modes when the transmission interference is above the first threshold and below a second threshold, wherein in the plurality of intermediate modes the wireless device transmits data and receives data simultaneously and activates one or more interference management processes, wherein the plurality of intermediate modes comprise:
a first intermediate mode, wherein in the first intermediate mode a first interference management process is activated, the first interference management process comprising a non-linear interference cancellation process;
a second intermediate mode, wherein in the second intermediate mode a second interference management process is activated, the second interference management process comprising reducing a maximum transmit power; and
a third intermediate mode, wherein in the third intermediate mode a third interference management process is activated, the third interference management process comprising modifying a transmission from the wireless device to re-assign transmit frequency allocations to increase a frequency separation between a transmission band and a receive band; and
configuring the wireless device to operate in a second mode when the transmission interference is above the second threshold, wherein in the second mode the wireless device transmits data and receives data during different time periods.

2. The method of claim 1 wherein different interference management processes are activated in different intermediate modes based on the transmission interference.

3. The method of claim 1 wherein, in the second intermediate mode, the maximum transmit power is reduced as the transmission interference increases.

4. The method of claim 3, the second intermediate mode further comprising:
determining a first interference when the wireless device is not transmitting;
determining the transmission interference when the wireless device is transmitting; and
adjusting the maximum transmit power based on a different between the first interference and the transmission interference.

5. The method of claim 4 wherein a first maximum transmit power during a first time period is reduced to a second maximum transmit power during a second time period based on a difference between the first interference and the transmission interference.

6. The method of claim 3 wherein the maximum transmit power is reduced by not more than a maximum transmit power reduction corresponding to particular increase in throughput loss.

7. The method of claim 3 further comprising:
determining the transmission interference when the wireless device is transmitting; and
activating said interference management process reducing the maximum transmit power when a difference between the transmission interference and a minimum transmission interference below which there is no data rate improvement is greater than a third threshold.

8. The method of claim 3 further comprising sending a maximum transmit power reduction from the wireless device to a base station to coordinate a data rate from the wireless device to the base station.

9. The method of claim 1 wherein modifying the transmission from the wireless device to increase the frequency separation between the transmission band and the receive band comprises narrow-banding the transmission.

10. The method of claim 1 wherein modifying the transmission from the wireless device to increase the frequency separation between the transmission band and the receive band comprises deactivating resource blocks proximate to the receive band of the wireless device.

11. The method of claim 10 wherein modifying the transmission further comprises adaptively filtering the transmission from the wireless device to attenuate resource blocks proximate to the receive band of the wireless device and to reduce a total transmit power.

12. The method of claim 10 wherein modifying the transmission further comprises sending one or more messages between the wireless device and a base station to deactivate said resource blocks proximate to a receive band of the wireless device.

13. The method of claim 1 wherein a plurality of the interference management processes are activated at the same time.

14. The method of claim 1 wherein one or more interference management processes are deactivated when one or more other interference processes are activated.

15. The method of claim 1 wherein the wireless device transmits a request to switch from at least one of the intermediate modes to the second mode when a maximum transmit power is reduced to a usable minimum and when a maximum number of resource blocks comprising transmission frequencies proximate to a receive band have been restricted from use in a transmission.

16. The method of claim 1 further comprising dynamically filtering a received RF signal between an antenna and a low noise amplifier in the first mode and the one or more intermediate modes, and bypassing said dynamic filtering in the second mode.

17. The method of claim 1 wherein the first mode and the intermediate modes are full duplex modes and the second mode is a half duplex mode.

18. The method of claim 1 wherein said transmission interference corresponds to a signal-to-interference ratio (SINR).

19. The method of claim 1 wherein said transmission interference corresponds to a data throughput.

20. The method of claim 1 wherein the wireless device is configured to transmit and receive a plurality of bands, wherein a first subset of the plurality of bands are home network bands and the wireless device operates in full duplex mode using dedicated wireless transmitters and wireless receivers for each home network band, and wherein a second subset of bands are secondary bands and the wireless device is configured to operate in said first mode, said intermediate modes, and said second mode using a tunable wireless transmitter and wireless receiver for the secondary bands.

21. The method of claim 20 wherein the secondary bands are roaming bands.

22. An apparatus comprising:
   a wireless device comprising a wireless transmitter and a wireless receiver,
   wherein the wireless device is configured to operate in a first mode when a transmission interference from the transmitter in the receiver is below a first threshold, wherein in the first mode the wireless device transmits data and receives data simultaneously;
   wherein the wireless device is configured to operate in a plurality of intermediate modes when the transmission interference is above the first threshold and below a second threshold, wherein in the plurality of intermediate modes the wireless device transmits data and receives data simultaneously and activates one or more interference management processes, wherein the plurality of intermediate modes comprise:
      a first intermediate mode, wherein in the first intermediate mode a first interference management process is activated, the first interference management process comprising a non-linear interference cancellation process;
      a second intermediate mode, wherein in the second intermediate mode a second interference management process is activated, the second interference management process comprising reducing a maximum transmit power; and
      a third intermediate mode, wherein in the third intermediate mode a third interference management process is activated, the third interference management process comprising modifying a transmission from the wireless device to re-assign transmit frequency allocations to increase a frequency separation between a transmission band and a receive band; and
   wherein the wireless device is configured to operate in a second mode when the transmission interference is above the second threshold, wherein in the second mode the wireless device transmits data and receives data during different time periods.

23. The apparatus of claim 22 wherein the receiver comprises:
   a low noise amplifier; and
   a tunable filter between the low noise amplifier and an antenna, the tunable filter configured to reduce a transmit power and transmission interference from the transmitter.

24. The apparatus of claim 22 wherein the wireless transmitter and wireless receiver are tunable, the wireless device further comprising a plurality of dedicated wireless transmitters and wireless receivers, wherein the wireless device is configured to transmit and receive a plurality of bands, wherein a first subset of the plurality of bands are home network bands and the wireless device operates in full duplex mode using said dedicated wireless transmitters and wireless receivers for each home network band, and wherein a second subset of the plurality of bands are secondary bands and the wireless device is configured to operate in said first mode, said intermediate modes, and said second mode using said tunable wireless transmitter and wireless receiver for the secondary bands.

* * * * *